Aug. 6, 1957  W. J. REYNOLDS  2,801,553
INDEXING MECHANISM
Filed April 30, 1956

INVENTOR.
WALTER J. REYNOLDS
BY
Buckhorn and Cheatham
ATTORNEYS

United States Patent Office 2,801,553
Patented Aug. 6, 1957

2,801,553
INDEXING MECHANISM

Walter J. Reynolds, Portland, Oreg., assignor, by mesne assignments, to Lynch Corporation, Anderson, Ind., a corporation of Indiana Application April 30, 1956, Serial No. 581,634

The portion of the term of the patent to be granted has been disclaimed beyond April 2, 1974

8 Claims. (Cl. 74—819)

This invention relates to an indexing mechanism and more particularly to a mechanism which will move a relatively heavy structure, such as a rotating table for a bagging machine, through definite steps between predetermined indexed positions and which will cushion the stopping of such structure at each position to thereby reduce noise and wear and at the same time accurately position the structure at the various positions.

Indexing mechanisms for structures, such as the rotary tables employed in many types of bagging machines, have, in general either abruptly stopped the structure being indexed or have employed cushioning springs in an attempt to cushion the stopping of the structure. In either case, it has been difficult to provide a simple structure which would stop the table in accurate position or which did not result in excessive noise or wear.

In accordance with the present invention, the structure to be indexed is frictionally urged in the desired direction of movement and is stopped in desired indexed positions by a pneumatically cushioned stop element engaging index elements carried by the structure and moved through a definite path. The stop element preferably has an inclined surface engaging similar surfaces on the index elements so that such index elements constitute cam elements tending to cam the stop element out of the path of the index elements. Movement of the stop element out of such path is resisted by a pneumatic cushioning means containing a trapped body of air. Indexing of the structure is accomplished by releasing such body of air and cushioning and stopping of the structure the next indexed position is accomplished by again providing such body of air. A preferred embodiment of the invention includes a pneumatic cylinder in which a body of air is trapped so as to resist movement of a piston. The piston is connected to the stop element so that movement of such stop element out of the path of the cam elements is resisted. Provision is made for releasing such body of air to allow the stop member to move out of the path of the cam elements and the stop element is thereafter moved back into such path and the trapped body of air reestablished. Such preferred arrangement employs a solenoid operated valve which opens to connect the pneumatic cylinder to the atmosphere and which remains open until a spring returns the stop element to its stopping position in the path of the cam elements.

It is therefore an object of the present invention to provide an improved indexing mechanism for a movable structure in which the structure is constantly urged in desired direction and is stopped at desired indexing positions by a pneumatic cushioning means.

Another object of the invention is to provide an improved indexing mechanism in which a movable structure frictionally urged in one direction of travel is stopped at desired indexed positions by a pneumatic cushioning mechanism.

Further object of the invention is to provide an indexing mechanism in which a rotating table is urged in one direction of rotation and stopped at desired indexed positions by the engagement of inclined cam surfaces carried by said table with a movable stop element and in which movement of such element by such cam surfaces is pneumatically cushioned in a manner stopping the table in accurate position while minimizing noise and wear on the parts of the indexing mechanism.

Other objects and advantages of the invention will appear in the following description of a preferred embodiment shown in the attached drawings of which:

Figure 1:
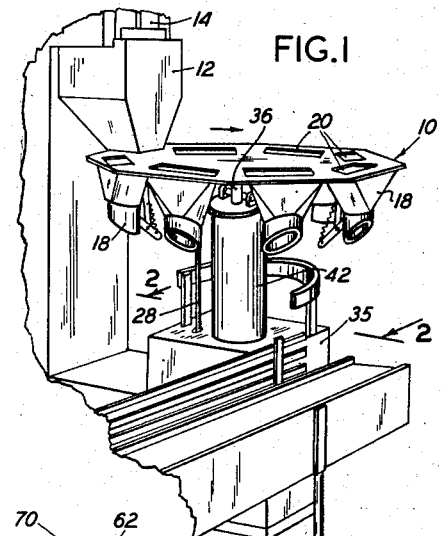
Fig. 1 is a fragmentary perspective view showing one type of indexing structure for which the present invention is particularly suitable.
Figure 2:
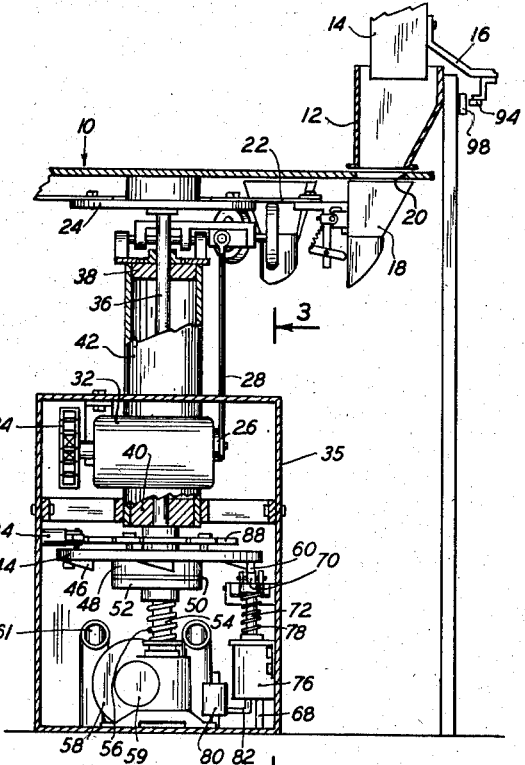
Fig. 2 is a vertical section taken approximately on the line 2—2 of Fig. 1.
Figure 3:
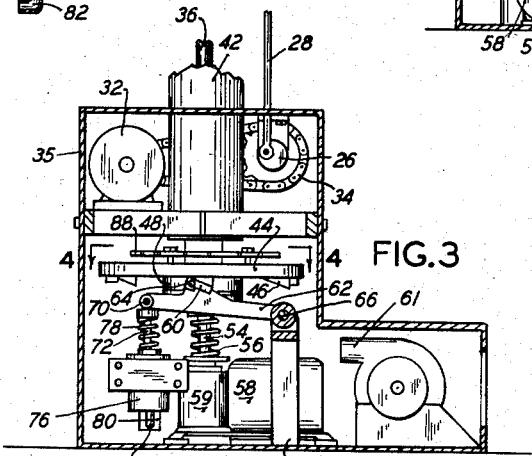
Fig. 3 is a vertical section through the indexing mechanism of the present invention taken on the line 3—3 of Fig. 2.

Referring more particularly to the drawings, Fig. 1 shows a rotary table 10 for a bagging machine having a discharge hopper 12 positioned above the table for receiving weighed charges of material from the bucket 14 of a scale, a small portion of the scale 16 being illustrated in Fig. 3. The table 10 has a plurality of bag receiving and holding structures 18 mounted below a plurality of openings 20 in the top surface of the table. Such bag holding structures may be resiliently mounted upon spring bars 22 (Fig. 2) secured to an annular collar 24 forming part of the table 10, the bag structures 22, when in loading position, being engaged by a vibrating mechanism including a crank disc 26 and a pitman rod 28, the crank disc 26 being driven by a motor 32 through a chain drive 34, the motor 32 and crank disc being mounted in the top portion of a casing 35 which also contains in its lower portion the indexing mechanism of the present invention.

The table 10 is secured to the upper end of a vertically extending shaft 36 mounted for rotation in upper and lower bearings 38 and 39 positioned in a vertically extending tubular member 42 supported in the casing 35. The lower end of the shaft 38 has secured thereto an indexing plate 44 which is circular and concentric with the shaft 36. The indexing plate 44 carries on its lower surface a plurality of circumferentially spaced cam elements 46, each having an inclined surface thereon sloping downwardly in a direction opposite to the direction of rotation of the shaft 36. The plate 44 also carries a downwardly extending friction member 48 which is of smaller size than the plate 44 and which is circular in form and concentric with the shaft 36. The friction member 48 has a downwardly directed surface engaging a friction element 50 carried by a lower friction member 52. The friction member 52 is slidably mounted on the upper end of a stub shaft 54 for movement longitudinally of such shaft but is constrained against rotation with respect to said shaft. The friction member 52 is urged upwardly to carry its friction element 50 into contact with the friction member 48 by means of a compression spring 56 surrounding the shaft 54. The shaft 54 and spring 56 are rotated by a motor 58 having a speed reducing mechanism 59 combined therewith the motor and speed reducing mechanism being mounted on the bottom of the casing 35. The indexing plate 44 and table 10 are thus frictionally urged in a direction of rotation indicated by the arrows in Figs. 1 and 4. The casing 35 may also include a motor driven fan having outlets 61 positioned to direct cooling air through the portion of the casing containing the motor 58 and friction members 48 and 52.

Figure 5:
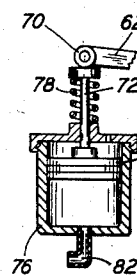
Fig. 5 is a fragmentary vertical section through the pneumatic cushioning cylinder.

The indexing plate 44 and the table 10 are held in indexed position by means of a stop element 60 most clearly shown in Fig. 3, which is pivotally mounted in a lever arm 62 by means of a horizontal pivot 64. The lever arm 62 has one of its ends mounted for pivotal movement about a horizontal pivot 66, carried in an upstanding standard 68 secured to the bottom of the casing. The other end of the arm 62 has a roller 70 engaging the head of a downwardly extending plunger rod 72 connected to a piston 74 (Fig. 5) in a cylinder 76. A spring 78 urges the piston 74 in an upward direction to urge the lever 62 in a clockwise direction in Fig. 3 to hold the stop element 60 carried by the lever 62 in the path of the cam elements 46. The stop element 60 provides an inclined surface engaging the inclined surfaces on the cam elements 46. When the indexing plate 44 rotates to bring one of the cam elements 46 into contact with the stop element 60, the cam member tends to cam the stop element out of the path of the cam elements to move the piston 74 of Fig. 5 downwardly within the cylinder 76 and the spring 78 surrounding the plunger rod 72 is of insufficient strength to resist such movement.

A solenoid operated valve 80 opens to establish communication between the atmosphere and the interior of the cylinders 76 through the pipe 82 and closes to prevent such communication. When the solenoid valve 80 is closed, the air trapped in the cylinder 76 prevents downward movement of the lever 72 in Fig. 3 and thus retains the stop element 60 in engagement with one of the cam elements 46 to stop rotation of the indexing plate 44. When the valve 80 is opened, the body of air trapped in the cylinder 76 is released and the cam element 46 in engagement with the stop element 60 cams the stop element 60 out of the path of the cam elements 46 and thus allows the motor 58 acting through the friction members 52 and 48 and the friction element 52 to rotate the indexing plate 44 and the table 10. During such camming action, the pivotal connection of the stop member 60 to the lever 62 provides for a substantial area of contact between the inclined surfaces of the cam elements 46 and the stop member 60 for a substantial portion of the time during the camming operation and thus reduce wear.

Figure 4:
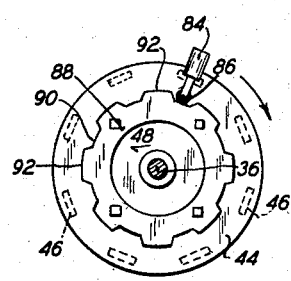
Fig. 4 is a partial horizontal section taken on the line 4—4 of Fig. 3.

The control system for the solenoid valve 80 holds the valve 80 open until the spring 78 has returned the lever 62 to its uppermost position and also for a sufficient length of time for a charge of air to reenter the cylinder 76. This control mechanism includes a cam operated switch 84 (Figs. 2 and 4) having a cam follower roller 86 engaging a cam 88 secured to the upper surface of the indexing plate 44 so as to rotate therewith. The cam 88 has a recess 90 and a lobe 92 for each cam element 46 corresponding to each position of the indexing table 10. When the cam follower roller 86 is in a recess 90 of the cam 88 as shown in Fig. 4, the switch 84 is open and this is the position which the cam follower roller 86 occupies when the indexing plate 44 is stopped by the stop element 60. As soon as the indexing plate 44 carrying the cam 88 starts to rotate, the next lobe 92 of the cam 88 engages the cam follower 86 of the switch 84 to close the switch until the indexing plate 44 approaches the next station at which time the cam follower roller 86 again enters a recess 90 to open the switch 84.

Figure 6:
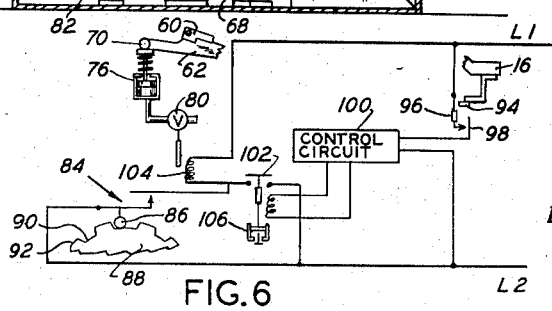
Fig. 6 is a schematic diagram of a simplified or elementary control circuit for the indexing mechanism of the present invention.

A schematic diagram of a simplified or elementary circuit for the indexing mechanism of the present invention is shown in Fig. 6. In such figure, a portion of a weighing scale 16 carries a small permanent magnet 94 to a position adjacent a small magnetic armature 96 when the scale makes its weight. This causes closing of a circuit at contacts 98 to complete a circuit between the lines L1 and L2 through a control circuit 100, which may be of any known or suitable type. In a commercial device, the contacts 98 and armature 96 are part of a commercially available mercury switch in which the contacts are enclosed within an airtight envelope. The control circuit 100 causes energization of a relay indicated diagrammatically at 102 after a time delay. The relay completes a circuit through the actuating coil 104 of the solenoid operated valve 80. This causes opening of the solenoid operated valve 80 to release the air trapped in the cylinder 76 and thus allow downward movement of the piston 74 to allow downward movement of the stop element 60 so as to release the indexing plate 44. As soon as the indexing plate 44 starts to move, the cam operated switch 84 is closed by a lobe 92 of the cam 88 to maintain the circuit through the actuating coil 104, after the relay 102 opens. The relay 102 has a time delay mechanism indicated as a pneumatic dashpot 106 in Fig. 6, which delays opening of the relay for a short period of time until the switch 84 is closed by rotation of the cam 88.

The operation of the machine should be apparent from the above description. The table 10 and indexing plate 44, as well as the cam 88, is urged by the motor 58 and speed reducer 59 in a direction to advance the cam elements 46 in Fig. 3 toward the inclined upper surface of the stop element 60. The friction device including the friction members 48 and 52 and friction element 50 enable the table 10 and indexing plate 44 to be restrained by one of the cam elements 46 engaging the stop element 60 to hold the table in a desired indexed position. Such engagement is maintained by air trapped in the cylinder 76 under control of a solenoid operated valve 80. As long as such air is trapped within the cylinder 76, the lever 62 carrying the stop member 60 is prevented from moving downwardly to release the indexing plate 44. When the solenoid valve 80 is opened, air escapes from the cylinder 76 to allow the piston 74 to be moved downwardly by the lever 62. The lever 62 is cammed downwardly by a cam element 46 in engagement with the stop element 60. This releases the indexing plate 44 and allows the motor 58 to rotate the table 10.

In the control circuit shown, the solenoid valve 80 has its coil 104 (Fig. 6) energized so as to open the valve shortly after a scale 16 makes its weight. That is to say, a relay 102 has its actuating coil energized from a control circuit 100 which provides a time delay in order to enable the bags to be completely filled and other operations to be performed before the actuating coil of the relay 102 is energized. The relay 102 closes its contacts as soon as its actuating coil is energized to close a circuit through the actuating coil 104 of the solenoid operated valve 80 but has a time delay dashpot 106 to prevent immediate reopening of its contacts. This provides time for the indexing plate and table 10 to rotate through a small angle before the contacts of the relay 102 open. As soon as the indexing plate 44 and associated cam 88 has rotated through such small angle, the cam operated switch 84 is closed by the cam follower roller 86 being engaged by lobe 92 on the cam 88. This holds the solenoid operated valve 80 in open position until the cam follwer roller 86 drops into another recess 90 of the cam 88 at which time another cam element 46 has approached the stop element 60. Time is thus provided for the spring 78 to return the lever 62 to its uppermost position and for a charge of air to again enter the cylinder 76 before the solenoid valve 80 is again closed. Stopping of the indexing plate 44 is thus cushioned by the air trapped in the cylinder 76 and the mechanism is reset for another indexing operation.

While I have illustrated and described a preferred embodiment of the invention, it is apparent that the details of the invention may be varied and that the invention is to be limited only by the scope of the following claims.

I claim:
1. An indexing mechanism for a movable structure comprising a plurality of index elements positioned in spaced relation on said structure to move in a predetermined path when such structure is moved, a stop element movable into and out of said path and having a portion engaged by said index elements when said stop element is moved into said path, said index elements cooperating with said engaged portion of said stop element when said structure is moved in one direction to cause said stop element to be moved out of said path, means for urging said structure in said one direction pneumatic cushioning means containing a trapped body of air resisting movement of said stop element out of said path to stop said structure with one of said index elements in engagement with said portion of said stop element, and control means for releasing said trapped body of air to allow said stop element to be moved out of said path and for thereafter returning said stop element to said path and again trapping a body of air in said cushioning means.

2. An indexing mechanism for a movable structure comprising a plurality of cam elements having inclined surfaces spaced on said structure and positioned to move in a predetermined path when such structure is moved, a stop element movable into and out of said path and having an inclined surface for engagement by the inclined surfaces of said cam elements when said stop element is positioned in said path, means for urging said structure in a direction tending to cause said stop element to be cammed out of said path by said cam elements, pneumatic cushioning means resisting movement of said stop element out of said path to stop said structure with the incline surfaces of one of said cam elements in engagement with the inclined surface of said stop element, and control means for releasing said cushioning means to allow said stop element to be cammed out of said path and for thereafter returning said stop element to said path and restoring said cushioning means.

3. An indexing mechanism for a movable structure comprising a plurality of cam elements having inclined surfaces positioned in spaced relation on said structure to move in a predetermined path when such structure is moved, a stop element movable into and out of said path and having an inclined surface for engagement by the inclined surfaces of said cam elements when said stop element is positioned in said path, means for urging said structure in a direction tending to cause said stop element to be cammed out of said path by said cam elements, pneumatic cushioning means containing a trapped body of air for resisting movement of said stop element out of said path to stop said structure with the incline surfaces of one of said cam elements in engagement with the inclined surface of said stop element, and control means for releasing said trapped body of air to allow said stop element to be cammed out of said path and for thereafter returning said stop element to said path and again trapping a body of air in said cushioning means.

4. An indexing mechanism for a rotatable table structure comprising a plurality of index elements spaced circumferentially around said table and positioned thereon to move in a predetermined circular path when said table is rotated, a stop element movable into and out of said path for engagement by said index elements when said stop element is moved into said path, said index elements cooperating with said engaged portion of said stop element when said table is rotated in one direction to cause said stop element to be moved out of said path, means for rotating said table in said one direction, pneumatic cushioning means having a body of air trapped therein for resisting movement of said stop element out of said path to stop said table with one of said index elements in engagement with said stop element, control means including a valve for releasing said trapped body of air to allow said stop element to be moved out of said path and thereby allow movement of said table and means for thereafter returning said stop element to said path and closing said valve to again stop said table with a succeeding index element in engagement with said stop element.

5. An indexing mechanism for a rotatable table structure comprising a plurality of cam elements having inclined surfaces and being spaced circumferentially around said table and positioned thereon to move in a predetermined circular path when said table is rotated, a stop element movable into and out of said path and having an inclined surface for engagement by the inclined surfaces of said cam elements when said stop element is moved into said path, means for urging said table in a direction about its axis tending to cause said stop element to be cammed up out of said path by said cam elements, a pneumatic cushioning means having a body of air trapped therein for resisting movement of said stop member out of said path to stop said table with the inclined surface of one of said cam elements in engagement with the inclined surface of said stop element, control means including a valve for releasing said trapped body of gas to allow said stop member to be cammed out of said path and thereby allow movement of said table and means for thereafter returning said stop element to said path and closing said valve to again stop said table with a succeeding cam element in engagement with the inclined surface of said stop element.

6. An indexing mechanism for a movable structure comprising a plurality of index elements spaced along said structure and positioned thereon to move in a predetermined path when said structure is moved, a stop element movable into and out of said path and having a portion for engagement by said index elements when said stop element is moved into said path, said index elements cooperating with said engaged portion of said stop element when said structure is moved in one direction to cause said stop element to be moved out of said path, friction means for urging said structure in said one direction, pneumatic cushioning means containing a body of trapped air for resisting movement of said stop element out of said path to stop said structure with one of said index elements in engagement with said stop element, a solenoid valve for releasing said body of trapped air to enable movement of said structure, resilient means for returning said stop element into said path and auxiliary means for retaining said valve in open position until said stop member has reached the limit of its movement into said path and a charge of air to be trapped has entered said cushioning means.

7. An indexing mechanism for a movable structure comprising a plurality of cam elements spaced along said structure and positioned thereon to move in a predetermined path when said structure is moved, a stop element movable into and out of said path and having a portion for engagement by said cam elements when said stop member is moved into said path, said cam elements cooperating with said engaged portion of said stop element when said structure is moved in one direction to cause said stop element to be moved out of said path, said path, said index elements cooperating with said engaged portion of said stop element when said structure is moved in one direction to cause said stop element to be moved out of said path, means for urging said structure in said one direction, pneumatic cushioning means including a cylinder and piston and containing a body of air trapped on one side of said piston for resisting movement of said stop element out of said path to stop said structure with one of said index elements in engagement with said portion of said stop element, a solenoid valve for releasing said body of trapped air to enable movement of said structure, resilient means for returning said stop element into said path and auxiliary means including a cam carried by said structure for retaining said valve in open position until said stop member has reached the limit of its movement into said path and a charge of air has entered said cylinder.

8. An indexing mechanism for a rotatable table structure comprising a plurality of cam elements having inclined surfaces spaced around said table and positioned thereon to move in a predetermined circular path when said table is rotated, a stop element movable into and out of said path and having an inclined surface for engagement by the inclined surfaces of said cam elements when said stop element is moved into said path, friction means for urging said table in a direction tending to cause said stop element to be cammed out of said path by said cam elements, pneumatic cushioning means including a cylinder and piston and containing a body of air trapped on one side of said piston for resisting movement of said stop element out of said path to stop said structure with the inclined surface of one of said cam elements in engagement with the inclined surface of said stop element, a solenoid valve for releasing said body of trapped air to enable movement of said structure, resilient means for returning said stop element into said path and means including a cam movable with said table and a switch operated thereby for retaining said valve in open position until said stop element has reached the limit of its movement into said path and a charge of air to be trapped has entered said cylinder.

References Cited in the file of this patent
UNITED STATES PATENTS

| | | |
|---|---|---|
| 303,327 | Scott | Aug. 12, 1884 |
| 1,200,822 | Erickson | Oct. 10, 1916 |
| 2,755,008 | Beltz et al. | July 17, 1956 |